United States Patent [19]

Nakayama

[11] Patent Number: 4,710,784

[45] Date of Patent: Dec. 1, 1987

[54] INK JET PRINTING DEVICE

[75] Inventor: Tetsuroh Nakayama, Mishima, Japan

[73] Assignee: Tokyo Electric Co., Ltd., Tokyo, Japan

[21] Appl. No.: 881,140

[22] Filed: Jul. 2, 1986

[30] Foreign Application Priority Data

Jul. 11, 1985 [JP] Japan ............................ 60-153301
Jul. 12, 1985 [JP] Japan ............................ 60-153490

[51] Int. Cl.$^4$ ........................................ G01D 15/16

[52] U.S. Cl. ............................ 346/140 R; 358/75; 358/298; 400/126

[58] Field of Search ...................... 346/140, 75, 46; 400/126, 124 IH; 358/75, 78, 298

[56] References Cited

U.S. PATENT DOCUMENTS 3,790,703 2/1974 Carley ........................ 346/140 X
4,571,597 2/1986 Kocot ........................ 346/140 X
4,593,296 6/1986 Dagna ........................ 346/140

*Primary Examiner*—Joseph W. Hartary
*Attorney, Agent, or Firm*—Frishauf, Holtz, Goodman & Woodward

[57] ABSTRACT

An ink jet printing device includes a first electrode, a printing head of ink jet type having at least one second electrode facing the first electrode for discharging ink from the second electrode toward the first electrode in response to a voltage applied between the first and second electrodes, and printing control unit for activating the second electrode according to data. The printing control unit controls the amount of ink discharged from the printing head by varying the waveform of voltage applied between the first and second electrodes according to concentration data.

11 Claims, 25 Drawing Figures

INK JET PRINTING DEVICE

BACKGROUND OF THE INVENTION

This invention relates to an ink jet printer for forming an image by selectively discharging ink by electrostatic means.

In a prior art ink jet printer, ink drops are selectively discharged by electrostatic force and attached to a recording medium to form dots, the image being formed as a selective combination of these dots. In such an ink jet printer, the dot diameter is fixed, so that it is impossible to provide a tone gradation to the image with an ordinary method. A dither method is employed as means for providing tone gradation to the image. In this method, one picture element is divided into a plurality of matrices, and dots are selectively formed in the matrices. In this case, the shade of the image is varied by varying the dot density in each picture element. When it is desired to obtain a high dot density image the number of dots formed in the picture element is increased. On the other hand, to obtain a low dot density image, the number of dots in the picture element is reduced. In this way, a tone gradation of the image is provided.

To obtain a natural or high quality image, it is necessary to increase the range of tone gradation. However, since the dot diameter is fixed, the number of matrices allotted to each picture element has to be increased to increase the range of tone gradation. This increases the size of the picture element and reduces the resolution of the image. Therefore, it has been impossible to obtain natural or high quality images by increasing the number of matrices in a picture element.

SUMMARY OF THE INVENTION

An object of the invention is to provide an ink jet printer which can effect the tone gradation of an image while still having a natural or high quality image.

To attain the above object of the invention, there is provided an ink jet printing device, which comprises a first electrode, a printing head of ink jet type having at least one second electrode facing the first electrode for discharging ink from the second electrode in response to a voltage applied between the first and second electrodes, and printing control means for selectively applying a voltage between said first and second electrodes according to dot data and controlling the amount of ink discharged from said printing head by varying electric energy applied between said first and second electrodes according to a concentration code.

According to the invention it is possible to obtain an image with varying tone gradations having a natural or high quality image, since it is possible to vary the concentration of each picture element by varying the dot dimension of the picture element.

DETAILED DESCRIPTION OF THE PREFERRED EMBODIMENT

Figure 1:
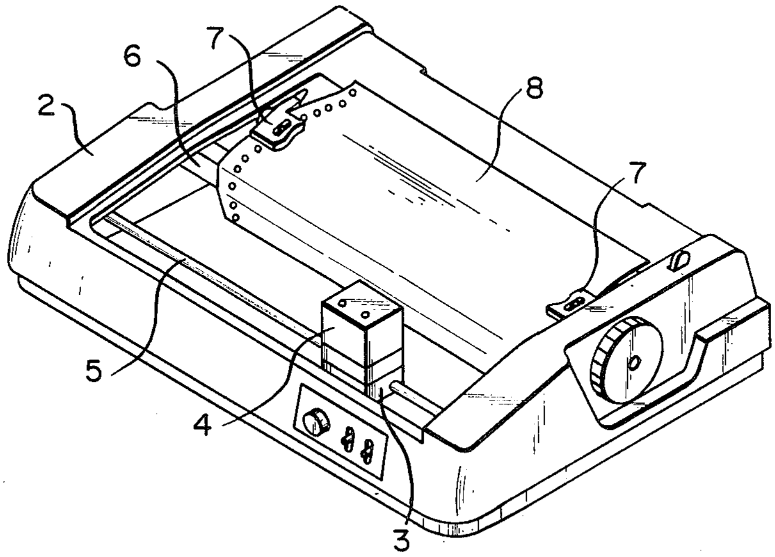
FIG. 1 is a perspective view showing an embodiment of an ink jet printing device according to the invention.

FIG. 1 is a perspective view showing an embodiment of the ink jet printer according to the invention. This ink jet printer comprises housing 2, carrier 3 which is mounted for reciprocation on guide shaft 5 fixed in housing 2 and carries printing head 4, back electrode 6 facing printing head 4, and tractor 7 for feeding recording sheet 8 in contact with electrode 6.

Figure 2:
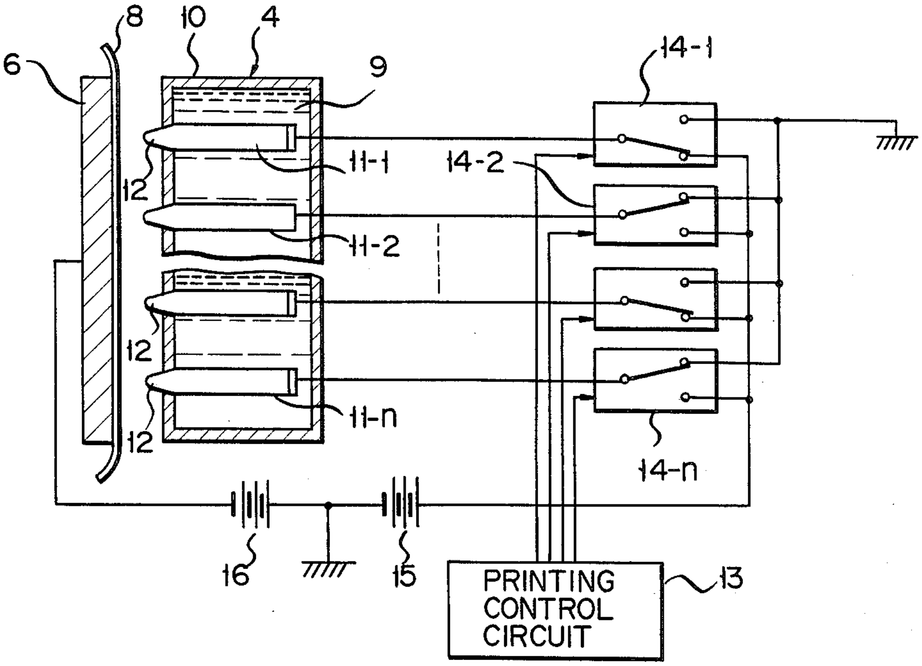
FIG. 2 is a circuit diagram showing an electric circuit of the printing device shown in FIG. 1.

Printing head 4 has a plurality of printing electrodes 11-l to 11-n used as printing elements arranged in a row in a case 10, in which ink 9 is accommodated, as shown in FIG. 2. Each printing electrode has a free end portion 12 projecting from case 10 toward back electrode 6. These printing electrodes 11-l to 11-n have both ink impregnation property and electric conductivity. They are connected to power supply 15 via respective switching elements 14-l to 14-n which are controlled by printing control circuit 13. Negative power supply 16 is connected to back electrode 6. Ink 9 has a resistivity of $10^7$ to $10^8$ Ω.cm and a surface tension of 20 to 30 dyn/cm.

Figure 3:
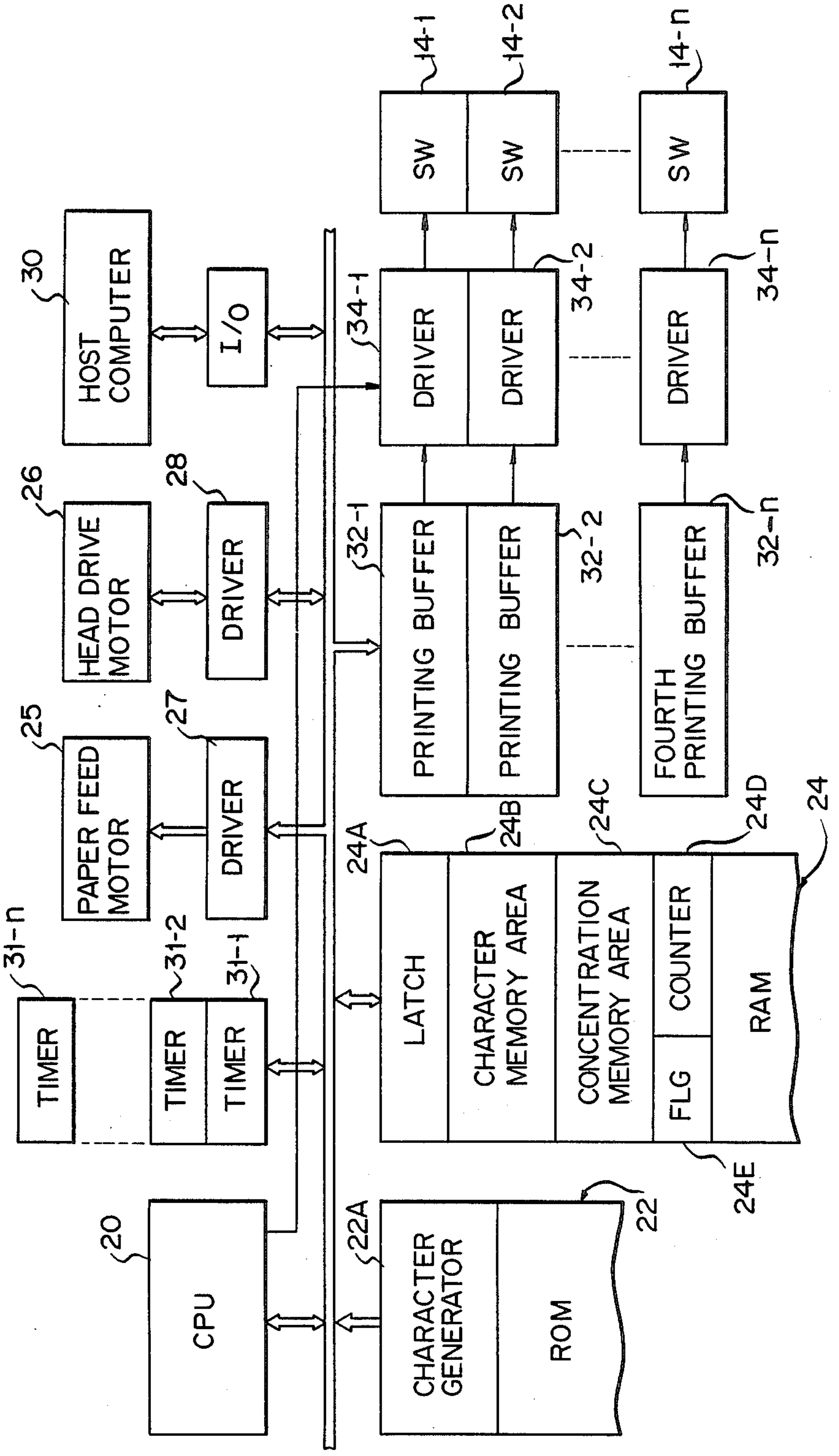
FIG. 3 is a block diagram showing the printing control circuit shown in FIG. 1.

FIG. 3 is a circuit diagram showing of printing control circuit 13 shown in FIG. 2. As is shown, printing control circuit 13 comprises CPU 20, ROM 22, which includes character generator 22A for generating character data corresponding to character code, and in which programs to be executed by CPU 20 are stored, and RAM 24, which includes latch 24A for latching character code and concentration code, character memory area 24B for storing character data, and concentration memory area 24C. CPU 20 is further coupled to paper feed motor 25 and head drive motor 26 via drivers 27 and 28. CPU 20 is further coupled to host computer 30 via an I/O port, and it is further coupled to timers 31-l to 31-n. Paper feed motor 25 feeds recording sheet 8 by a predetermined distance in a direction parallel to the line of printing elements 11-l to 11-n every time printing of character data for one line is effected. Head drive motor 26 moves printing head 4 in a direction perpendicular to the line of printing elements 11-l to 11-n for every printing operation. Host computer 30 feeds character codes, concentration codes, image data, printing mode data, etc. to CPU 20. CPU 20 is further coupled to printing buffers 32-l to 32-n. These printing buffers 32-l to 32-n are coupled to switching elements 14-1 to 14-n shown in FIG. 2 via drivers 34-1 to 34-n.

Driver 34-i receives successive dot data of character data in printing buffer 32-i. When it receives dot data for "0", for instance, it sets switching element 14-i to a first position and grounds electrode 11-i. When driver 34-i receives dot data for "1", it sets switching element 14-i at a second position and applies the output voltage of power supply 15 to electrode 11-i for a period corresponding to concentration data. Normally, electrode 11-i is impregnated with ink 9. With a positive voltage applied to electrode 11-i, therefore, ink impregnated in the top end portion of the electrode receives an electrostatic force. Ink in the top end portion 12 is thus discharged toward back electrode 6 and attached to recording sheet 8 to form a dot on the printing sheet. A desired image is printed on recording sheet 8 with selective formation of such dots.

In this embodiment, it is possible to set four different voltage application periods according to concentration data. The amount of ink 9 discharged is varied by varying the voltage application period. This is because the amount of ink discharged continues to vary until a stringy ink discharge state is attained, and the stringy ink discharge state is maintained so long as voltage continues to be applied, so that the amount of ink forming a dot on the recording sheet is increased with increase of the voltage application period.

Figure 4:
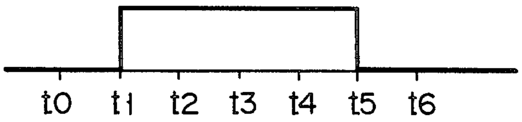
FIG. 4 is a waveform diagram showing a voltage applied to the printing electrode shown in FIG. 2.
Figure 5:
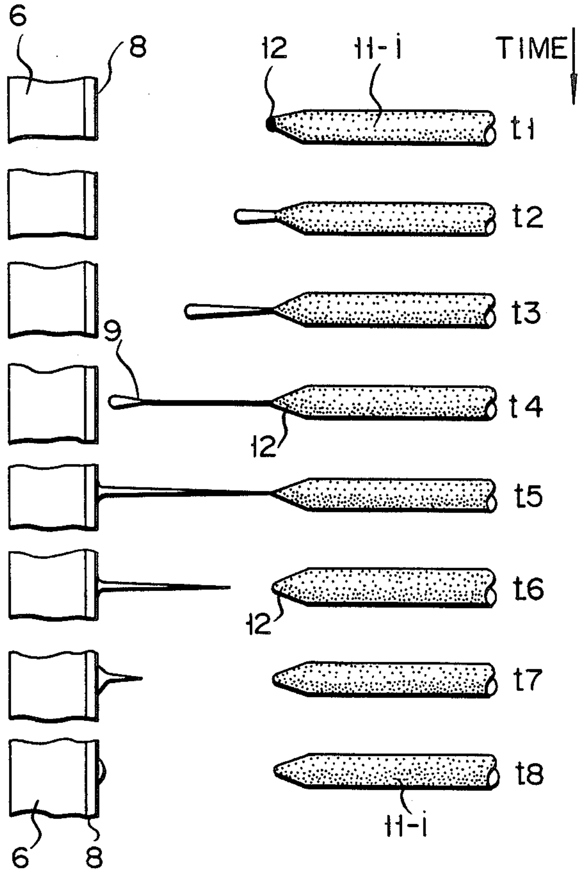
FIG. 5 is a view showing a manner, in which ink is discharged from a recording electrode when a voltage shown in FIG. 4 is applied.

FIG. 5 illustrates the way of discharge of ink from printing electrode 11-i when voltage is applied to electrode 11-i for a period from instant t1 to t5 as shown in FIG. 4. As is seen from FIG. 4, with application of voltage on electrode 11-i at time t1, ink is concentrated on top end 12 of electrode 11-i, and with the lapse of time ink 9 is discharged from end 12. In this case, so long as voltage continues to be applied, the discharge of ink 9 from top end 12 is not interrupted, and the leading end of discharged ink 9 eventually reaches recording sheet 8. In this way, the stringy ink discharge state is obtained. When the voltage applied is interrupted at instant t5, the discharge of ink 9 from end 12 is stopped. Thus, the amount of ink discharged from electrode 11-i from time t1 till time t5 is attached to recording sheet. If voltage is continually applied after instant t5, the amount of ink on recording sheet 8 is increased, and the stringy ink discharge state that prevailed at instant t5 is maintained. Therefore, by increasing the period of voltage application the amount of ink attached to the recording sheet is increased to increase the size of the printed dot. More specifically, when printing image data with low concentration, a short voltage application period is set to form small diameter dots, whereas for printing image data with a high concentration a long voltage application period is set to form large diameter dots. For instance, four different diameter dots can be formed by continuing voltage application for periods from time t1 to times t2 to t4. In this case, a tone gradation is produced in the printed image. This gradation stems from the dot diameter differences. The range of gradation can be increased by increasing the difference between the minimum and maximum dot diameters and the number of gradation steps can be increased by finely changing the dot diameters.

It is to be noted that the dot density is held constant irrespective of variations of the dot diameter. That is, the dot density will not become coarse by increasing the gradation range. In other words, it is possible to increase the gradation range without spoiling the natural image quality.

Figure 6:
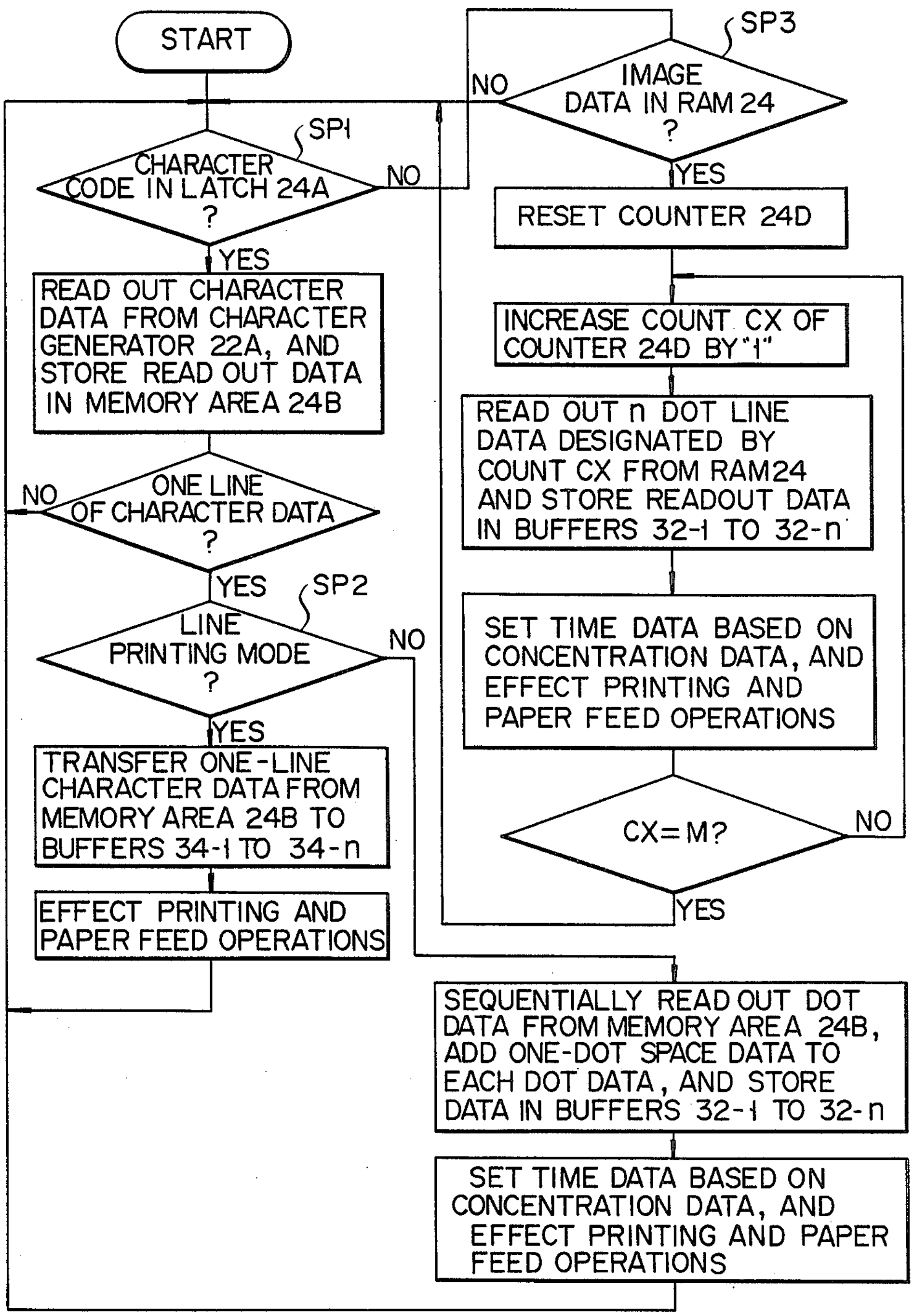
FIG. 6 is a flow chart explaining the operation of the control circuit shown in FIG. 3.

FIG. 6 is a flow chart for explaining the operation of printing control circuit 13 shown in FIG. 2.

In an initialization step, CPU 20 clears the contents of RAM 24 and printing buffers 32-1 to 32-n. In subsequent step SPl, CPU 20 effects a check as to whether character and concentration codes are stored in latch 24A of RAM 24. If "YES" in step SPl, CPU 20 stores flag data indicating whether or not a line printing mode is set in memory area 24E, and then it reads out dot character data designated by the character code from character generator 22A and stores the read-out data in character memory area 24B of RAM 24. At the same time, it stores time data corresponding to the concentration code in concentration memory area 24C. This operation is executed repeatedly until character data for one line is stored in character memory area 24B.

In subsequent step SP2, CPU 20 checks to see if data "1" representing line printing is stored in memory area 24D. If "YES" in step SP2, CPU 20 transfers n rows of dot line data contained in one-line character data from character memory area 24B to printing buffers 34-1 to 34-n. CPU 20 then continuously drives drivers 34-1 to 34-n according to dot line data in printing buffers 32-1 to 32-n. When printing of the one-line character data is completed, the recording sheet 8 is fed by a predetermined distance, and then step SPl is executed once again.

If the result of check in step SP2 is "NO", that is, if it is detected that the dot printing mode is set, CPU 20 sequentially reads out dot data in n rows of dot line data from character memory area 24B, adds one-dot space data to each dot data and stores the resultant data in the printing buffers 32-1 to 32-n. Subsequently, CPU 20 sets corresponding time data stored in memory area 24C to timer 31 and prints n dot data from printing buffers 32-1 to 32-n. In this case, the same time data is set in timer 31-1 when printing dot data included in the same character data. In the dot printing mode, the speed of carrier 3 is set to one half that in the line printing mode. Alternatively, a period of voltage application may be set at one half that in the line printing mode without adding one-dot space data to each dot data.

If "NO" in step SP1, CPU 20 executes step SP3 to check whether image with time data added to each dot data is stored in RAM 24. The time data represents concentration of the dot data to which the time data is added. If the result of check in step SP3 is "YES", i.e., if it is detected that image data having $n \times M$ dot line data is stored in RAM 24, CPU 20 resets counter 24D. Then it increases the count of counter 24D by "1". Then, it reads out one set of n dot line data designated by the contents of counter 24D from RAM 24 and stores the read-out data in printing buffers 32-1 to 32-n. Then it stores time data added to each dot data of n dot line data in memory area 24C. CPU 20 reads out n time data related to n dot data to be printed in the next printing cycle from memory area 24C and sets time data in timers 31-1 to 31-n for printing n dot data from printing buffers 33-1 to 33-n. In this case, time data added to n dot data to be printed has been set in timers 32-1 to 32-n, and when the time periods set in timers 32-1 to 32-n have elapsed, the operations of respective drivers 34-1 to 34-n are interrupted to stop printing of corresponding dot data from printing buffers 32-1 to 32-n. This printing operation is executed repeatedly to print all the n dot line data. Thereafter, the recording sheet is fed by a predetermined distance.

Figure 7:
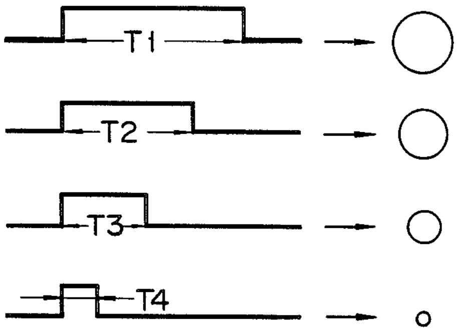
FIG. 7 shows the relation between periods of application of voltage to a printing electrode and printed dots.
Figure 8A:
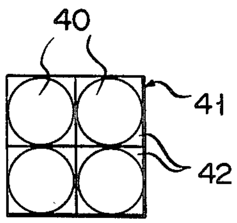
FIGS. 8A to 8D show picture elements each constituted by four dots having the same diameter.
Figure 8B:
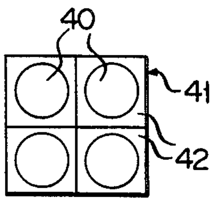
Figure 8C:
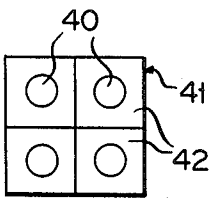
Figure 8D:
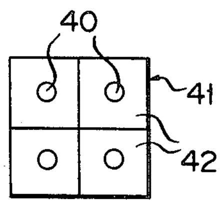

FIG. 7 shows differences in diameters of dots printed by printing electrode 11-i when four different periods of activating driver 34-i are set to determine the period T of voltage application to printing electrode 11-i, for T1, T2, T3, and T4 (T1>T2>T3>T4).

Suppose now that CPU 20 reads out time data T1, T2, T3, or T4 from concentration memory area 24C and sets the time data in timer 31-i. It drives driver 34-i for the set period T1, T2, T3, or T4 to effect the printing of dot data from printing buffer 32-i.

When printing character data in the dot printing mode, each picture element is divided into four matrices as shown in FIGS. 8A to 8D, and dot data is selectively printed in these matrices. When printing characters including picture elements shown in FIGS. 8A to 8D, time data T1, T2, T3, or T4 representing the concentration given to each character from concentration memory area 24C is set in timer 31-1. Where n printing electrodes arranged in a column as shown in FIG. 2 are used, n/2 picture elements can be printed during two printing cycles.

By varying the diameter of the dots 40 to be selectively printed according to the dot data in the four matrices 42, a picture element 41 having 16 different concentration levels can be obtained. With these concentration levels and also in case of a picture element concentration level where no dot is printed in the matrices, it is possible to form a picture element having a total of 17 different concentration levels.

Figure 9:
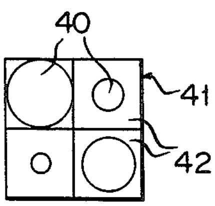
FIG. 9 is a view showing a picture element constituted by four dots having different diameters.

Further, when printing image data of a drawing pattern or the like, it is possible to form four dots having different diameters in the respective four matrices as shown in FIG. 9. More specifically, when printing pattern data, time data T1, T2, T3, or T4 added to n dot data on a column to be printed is read out from memory area 24C and set in timers 31-1 to 31-n. Thus, each dot is printed with a diameter corresponding to given time data. In this case, therefore, it is possible to form a picture element, which can have a very large number of different concentration levels.

Figure 10:
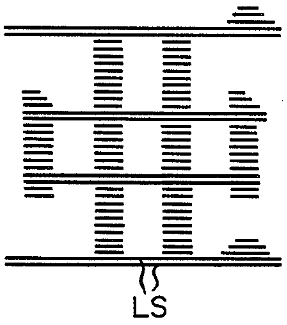
FIG. 10 shows an example of a printed character obtained in a line printing mode.

In the line printing mode, ink dot data "1" can be printed in the form of a line by moving printing head 4 with respect to recording sheet 8 while maintaining a stringy ink discharge state. Further, when dot data "1" is generated continuously, a plurality of line segments printed according to the dot data "1" are coupled together so that a long line is printed. FIG. 10 shows an example of a character consisting of line segments LS printed in the line printing mode.

Figure 11:
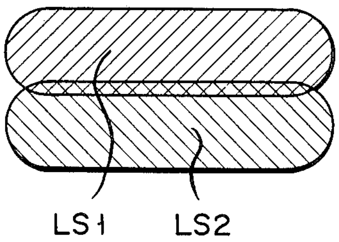
FIG. 11 shows two printed line segments having a large thickness formed in the line printing mode.

FIG. 11 shows a manner, in which the thickness of line segments printed in the line printing mode is increased so that two adjacent line segments LS1 and LS2 overlap. The thickness of the line segments can be increased by reducing the speed of printing head 4 relative to recording sheet 8 or increasing the voltage applied to the printing head.

Figure 12:
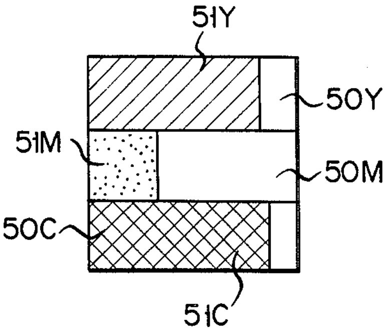
FIG. 12 shows a color picture element obtained in color printing.
Figure 13:
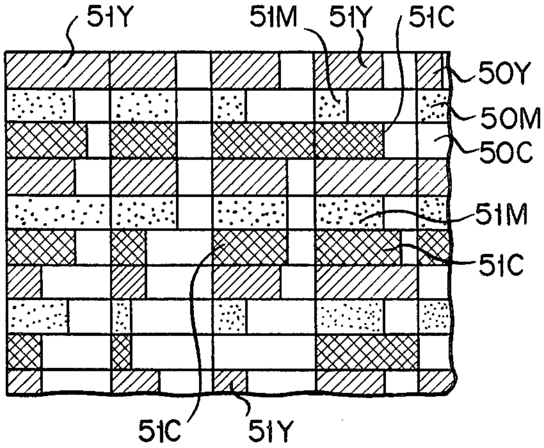
FIG. 13 shows image data constituted by a plurality of picture elements having the same structure as the picture element shown in FIG. 12.

In an ink jet printer shown in FIGS. 2 and 3, it is possible to obtain color printing by replacing printing head 4 by a printing head having three printing electrodes respectively arranged in yellow ink, magenta ink, and cyan ink. At the time of the printing operation, a plurality of picture elements as shown in FIG. 12 can be printed on a line through selective activation of printing electrodes for three-color printing according to dot data for periods corresponding to time data while driving printing head 4 at a predetermined speed with respect to a recording sheet. By repeatedly executing this printing operation in the well known manner, image data constituted by a plurality of color picture elements can be printed as shown in FIG. 3. In the Figure, yellow, magenta, and cyan scanning areas 50Y, 50M, and 50C are provided in the horizontal direction, i.e., in the direction in which the printing head is driven. In these scanning areas 50Y, 50M, and 50C are respectively formed yellow, magenta, and cyan ink areas 51Y, 51M, and 51C having lengths corresponding to time data. The lengths of these ink regions can be varied by varying the time data set in predetermined three of timers 31-1 to 31-n to change the periods of the corresponding drivers being driven.

Thus, substantially all the colors can be reproduced by varying the lengths of yellow, magenta, and cyan areas in each picture element.

Figure 14:
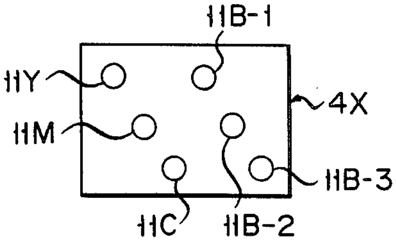
FIG. 14 shows a printing head used for color printing.

FIG. 14 shows printing head 4X in a different embodiment of the invention. Printing head 4X has yellow, magenta, and cyan electrodes llY, llM, and llC arranged in a row extending along an oblique line and three black ink electrodes llB-1 to llB-3 arranged in a row parallel to the row of printing electrodes llY, llM, and llC.

Basically, printing head 4X is controlled in the same manner as described before in connection with FIGS. 11 and 12. More specifically, the same printing operation as described above is executed in case where black ink printing electrodes llB-1 to llB-3 are not operated.

Figure 15:
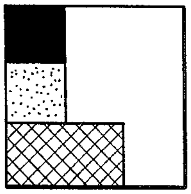
FIGS. 15 and 16 show examples of picture elements printed using the printing head shown in FIG. 14.

The black ink electrodes are used when all the color printing electrodes llY, llM, and llC are used in the same picture element. For example, when forming a picture element obtainable by printing the yellow, magenta, and cyan inks in proportions of 1:2:3, the lengths of the yellow, magenta, and cyan areas are not set to D, 2D, and 3D, but black, magenta, and cyan areas having respective lengths of D, D, and 2D are formed in the respective yellow, magenta, and cyan scanning areas, as shown in FIG. 15. The black area of length D corresponds to a combination of yellow, magenta, and cyan areas of length D.

Figure 16:
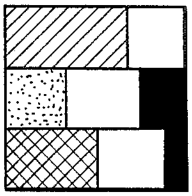

It is possible to form a picture element as shown in FIG. 16 by using printing head 4X shown in FIG. 14. In this picture element, black dots are formed in margin portions. It is thus possible to obtain a strong color, which can not be obtained with a mere combination of three color areas in the picture element.

Figure 17:
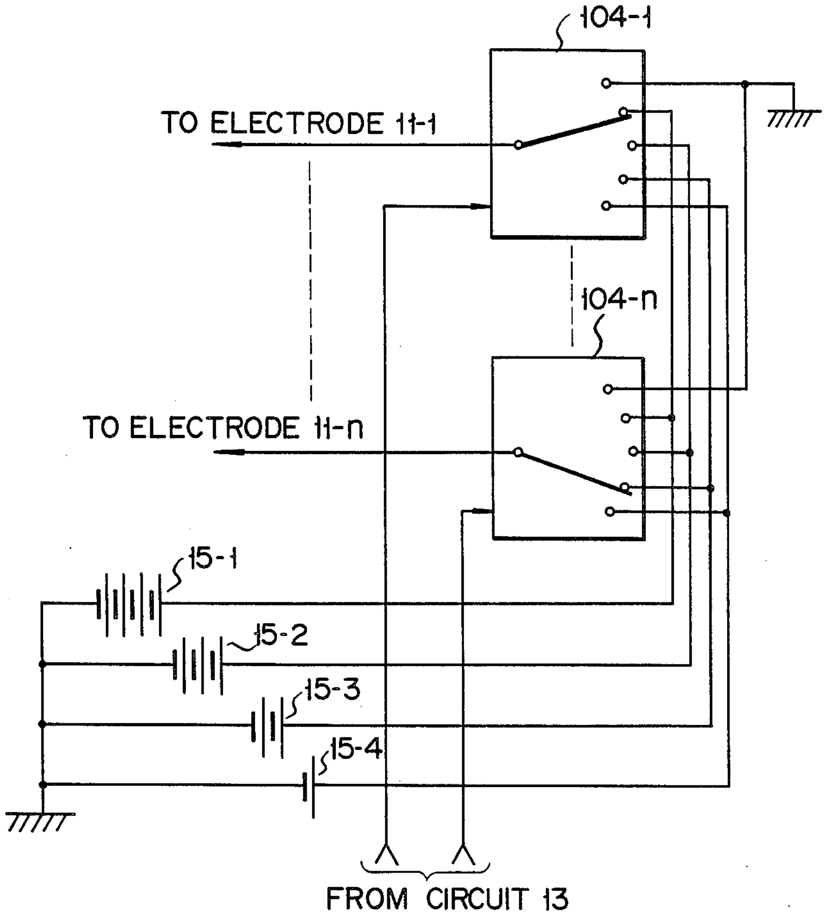
FIG. 17 is a modification of a voltage generator shown in FIG. 2.
Figures 18A, 18B, 18C, 18D:
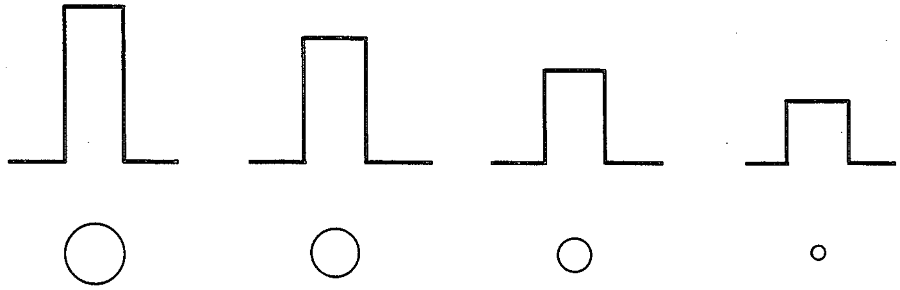
FIGS. 18A to 18D show the relation between voltage applied to the printing electrode and a printed dot.

FIG. 17 shows switching elements 104-1 to 104-n which can be used in lieu of switching elements 14-1 to 14-n shown in FIGS. 2 and 3. Switching elements 104-1 to 104-n each have first to fifth switching positions. In the first position of the switching element, the corresponding one of electrodes 11-1 to 11-n is grounded. When the switching element is set to one of the second to fifth positions, one of positive power supplies 15-1 to 15-4 is connected to the corresponding electrode to apply voltage V1, V2, V3, or V4 (V1>V2>V3>V4).

In this embodiment, concentration data VCD is stored in lieu of or in addition to the time data to be set in timers 31-1 to 31-n in concentration memory area 24C. The concentration data is fed together with dot data to printing buffers 32-1 to 32-n. In the printing operation, the concentration data and dot data are fed from printing buffers 32-1 to 32-n to drivers 34-1 to 34-n. When the driver receives dot data "0", it sets the corresponding switching element to the first position, i.e., grounding position. When the driver receives dot data "1", it sets the switching element to one of the second to fifth positions according to the concentration data. Thus, voltage of 0 V, V1, V2, V3, or V4 is selectively applied to printing electrodes 11-1 to 11-n. When a higher voltage is applied, a greater amount of ink is discharged from the printing electrode. For instance, when voltages V1 to V4 are applied, dots as shown in FIGS. 18A to 18D are formed by the printing electrode. Thus, it is possible to form picture elements shown in FIGS. 8A to 8D by varying the voltages applied to printing electrodes 11-1 to 11-n.

Figure 19:
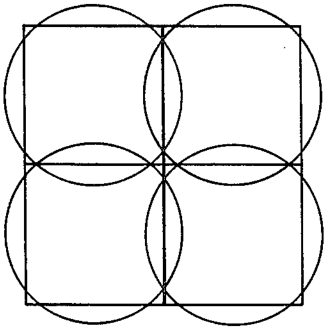
FIG. 19 shows a picture element obtained by increasing the level of voltage applied under printing conditions for obtaining the picture element shown in FIG. 8A.

It is possible to form picture elements having large dots as shown in FIG. 19 by using timers 31-1 and switching elements 104-1 to 104-n and executing printing operation by setting time T1 in timer 31-1 and setting switching elements 104-1 to 104-n to the second position. It is possible to print dots of various sizes by using timers 31-1 to 31-n and switching elements 104-1 to 104-n in various combinations.

While some preferred embodiments of the invention have been described in the foregoing, these embodiments are by no means limitative. For instance, while in the embodiment shown in FIG. 2 printing has been done for n dot lines at a time with n printing electrodes, it is also possible to effect printing for each dot line using a single printing electrode.

Further, while each picture element has been divided into a plurality of matrices, it is possible to express each picture element as a single dot.

What is claimed is:

1. An ink jet printing device, comprising:

a first electrode;

a printing head of an ink jet type having at least one second electrode, and means for supporting said printing head so that said at least one second electrode faces said first electrode for discharging ink from said second electrode toward said first electrode in response to a voltage applied between said first and said second electrodes during a printing cycle;

power supply means connected to said first and said second electrodes for applying said voltage from at least one voltage source;

means for supporting a recording medium between said printing head and said first electrode;

printing control means coupled to said power supply means for selectively applying a voltage between said first and said second electrodes according to predetermined dot data representing a character to be printed, and for controlling the amount of ink discharged from said second electrode of said printing head by varying electric energy applied between said first and said second electrodes according to a preset concentration code, and the size of ink markings to be printed on the recording medium is correspondingly varied to obtain a desired grade of printed tone.

2. The ink jet printing device according to claim 1, wherein said printing control means includes timer means for counting time data corresponding to the concentration code, and driver means for activating the second electrode according to said dot data for a period of time from the start till the end of counting of the time data in by said timer means.

3. The ink jet printing device according to claim 2, wherein said driver means includes voltage generating means capable of selectively supplying a plurality of different level voltages to the second electrode, and a driver circuit for supplying a voltage of a level corresponding to said concentration code from said voltage generating means to said second electrode according to said dot data.

4. The ink jet printing device according to claim 3, which further comprises a head driving unit for moving the printing head along the direction of said first electrode at the time of the printing operation, said driver means including means for applying voltage to said second voltage continuously according to said dot data while said printing head is being moved, for forming a continuous line segment on the recording medium.

5. The ink jet printing device according to claim 2, which further comprises a head driving unit for moving said printing head along the direction of said first electrode at the time of the printing operation, said driver means including means for applying voltage to said second electrode continuously according to said dot data while said printing head is being moved, for forming a continuous line segment on the recording medium.

6. The ink jet printing device according to claim 2, wherein said printing head includes color ink cases for accommodating three different color inks, and at least one second electrode associated with each of said ink cases.

7. The ink jet printing device according to claim 6, wherein said printing head includes a black ink case accommodating black ink and additional electrodes associated with said black ink case, said additional electrodes being placed in line with respective second electrodes.

8. The ink jet printing device according to claim 7, wherein said driver means includes voltage generating means capable of selectively supplying a plurality of different level voltages to said second electrode, and a driver circuit for selectively supplying a voltage of a level corresponding to said concentration code from said voltage generating means to said second electrode according to said dot data.

9. An ink jet printing device, comprising:

a first electrode;

a printing head of an ink jet type having at least one second electrode, and means for supporting said printing head so that said at least one second electrode faces said first electrode for discharging ink from said second electrode toward said first electrode in response to a voltage applied between said first and said second electrodes;

power supply means connected to said first and said second electrodes for applying said voltage from at least one voltage source;

means for supporting a recording medium between said printing head and said first electrode; and printing control means for selectively applying said voltage between said first and said second electrodes according to predetermined dot data representing a character to be printed, and for controlling the amount of ink discharged from said second electrode of said printing head by varying electric energy applied between said first and said second electrodes according to a preset concentration code;

wherein said printing control means includes timer means for counting time data corresponding to the concentration code, and driver means for activating the second electrode according to said dot data for a period of time from the start till the end of counting of the time data by said timer means, and said driver means includes voltage generating means capable of selectively supplying a plurality of different level voltages to the second electrode, and a driver circuit for supplying a voltage of a level corresponding to said concentration code from said voltage generating means to said second electrode according to said dot data.

10. The ink jet printing device according to claim 9, including a head driving circuit for moving the printing head along the direction of said first electrode at the time of the printing operation, said driver means including means for applying a voltage to said second electrode continuously according to said dot data while said printing head is being moved, for forming a continuous line segment on the recording medium.

11. An ink jet printing device, comprising:

a first electrode;

a printing head of an ink jet type having at least one second electrode, and means for supporting said printing head so that said at least one second electrode faces said first electrode for discharging ink from said second electrode toward said first electrode in response to a voltage applied between said first and said second electrodes;

power supply means connected to said first and said second electrodes for applying said voltage from at least one voltage source;

means for supporting a recording medium between said printing head and said first electrode;

mode specifying means for selectively specifying a dot or a line printing mode;

memory means for storing character and concentration data relating to a character to be printed; and printing control means coupled to said power supply means and said memory means, for selectively applying a voltage between said first and said second electrodes according to said character data, and for controlling the amount of ink discharged from said second electrode of said printing head by varying electric energy applied between said first and said second electrodes according to said concentration data;

wherein said printing control means reads out said character data from said memory means in a printing cycle to enable said printing head to print, according to the read out character data, a dot or dots with respective sizes determined by said concentration code when said dot printing mode is specified by said mode specifying means, or a line segment or segments with respective thicknesses determined by said concentration code when said line printing mode is specified by said mode specifying means.

* * * * *